(12) United States Patent
Erickson

(10) Patent No.: US 9,233,463 B2
(45) Date of Patent: Jan. 12, 2016

(54) MODULAR WEIGHTED BASE BICYCLE STAND

(71) Applicant: Glenn Erickson, Sheboygan, WI (US)

(72) Inventor: Glenn Erickson, Sheboygan, WI (US)

( * ) Notice: Subject to any disclaimer, the term of this patent is extended or adjusted under 35 U.S.C. 154(b) by 0 days.

(21) Appl. No.: 14/469,222

(22) Filed: Aug. 26, 2014

(65) Prior Publication Data

US 2015/0060636 A1 Mar. 5, 2015

Related U.S. Application Data

(60) Provisional application No. 61/870,652, filed on Aug. 27, 2013.

(51) Int. Cl.
*F16M 11/00* (2006.01)
*B25H 1/00* (2006.01)
*F16M 11/24* (2006.01)
*B62H 3/02* (2006.01)

(52) U.S. Cl.
CPC ............. *B25H 1/0014* (2013.01); *F16M 11/24* (2013.01); *B62H 3/02* (2013.01)

(58) Field of Classification Search
CPC .............. B62H 3/00; B62H 3/10; B62H 3/02; B25H 1/0014
See application file for complete search history.

(56) References Cited

U.S. PATENT DOCUMENTS

| 4,324,384 A * | 4/1982 | Elser .............................. 254/8 B |
| 6,575,310 B2 * | 6/2003 | Chamoun ........................ 211/22 |
| 2012/0007298 A1 * | 1/2012 | Proietti ........................... 269/59 |

* cited by examiner

*Primary Examiner* — Amy Sterling
(74) *Attorney, Agent, or Firm* — Mandy L. Tran, Esq.

(57) ABSTRACT

A modular weighted base bicycle stand having cross over and adjustable application. Said bicycle stand is comprised of light weight weather enduring durable material. The device of this invention having a removably attachable weighted planar base and several removably attachable extendable arms.

9 Claims, 5 Drawing Sheets

MODULAR WEIGHTED BASE BICYCLE STAND

CROSS REFERENCES

This non-provisional patent application claims benefit of the provisional patent application, Application No. 61/870,652, effectively filed on Aug. 27, 2013, pursuant to 35 U.S.C. 119(e) and 37 C.F.R. 1.78 (a)(4)-(a)(6) and all other relevant sections of the law not otherwise referred to herein. This application further incorporates by reference all prior disclosures of said Application No. 61/870,652.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF THE INVENTION

1. Field of the Invention

The present inventive subject matter relates to a modular weighted base bicycle stand, particularly having removably attachable base and removably attachable extendable arms and being universally adaptable for any variety of bicycle types over any variety of environmental conditions.

2. Background

Modern day bicycle stands, particularly those with practical applications for mechanical maintenance, comprise a variety of embodiments that as a whole, lack universal capabilities and accommodations. Bicycle stands are traditionally designed with an intended type of bicycle or a manner of suspension (not excluding manufacturing and cost considerations) in mind. Given the wide variety of bicycle design and material composition, there are few cross-over bicycle stands in the market that address the specific needs of cyclists within their niche culture of use. Further, all stands available in the market are manufactured in their entirety to predetermined specifications and from new raw material.

Each type of bicycle stand provided in the prior art can be distinguished from each other by several features, not limited to the following: 1) the manner of adjusting the stand, 2) the means for suspending a bike, 3) the types of bicycles that are accommodated, 4) the location of contact on a given bicycle, 5) the types of environment warranted for use and 6) the scale of portability. The claimed benefit of one design may be detrimental in alternative application because the intended effect was not with cross over application in mind. For example, a modern popular design in the market for portable bicycle stands provide a tripod style stand with single arm extension having clamping means for suspending said bicycle central to its frame. This is a very unstable design with heavy gravitational force against a single leverage point on the metal frame. With larger performance bicycles that comprise softer frame material, warping or bending often occurs. Modern manufacture of high performance bicycles have dictated lighter weight alloy metal composites such as aluminum alloys, titanium, carbon fiber, and even bamboo or cardboard. The popular clamping means in the market are designed with heavier steel frames in mind.

Consider, for example, a cyclist during long distance race requiring timely adjustment of frame components several times throughout a trek. The terrain will vary and so will the tuning needs of the bicycle. Portability in size and weight, quick set up and break down, adaptability to changing environment and ease in fine tune adjustment are valuable concerns. Alternatively, a BMX cyclist or a mountain cyclist traversing uneven terrain will face unpredictable adjustment needs due to the high impact nature of the sport. In this case, adaptability to all weather and soiling conditions, the ability to manage both fine tuning and larger repair, and maintain stability over rough terrain are focuses of consideration. Even further, a city cyclist traversing high traffic city environment will require a stand that is convenient in portability, can be set up and broken down with minimum effort for agility, and has built in stability to manage the high risk scenario.

Performance cycling has developed popularity in the present time. Particularly in western culture, the purpose having switched from a utilitarian need to recreational, health and competitive interests. Performance bicycles include among its variety mountain bikes, dirt bikes, road bikes, tour bikes, cross bikes, stunt bikes, cyclo-cross bikes, etc. The frame structure among these is not the same between the varieties of niche bicycles in the market. There are more than 11 types of known popular bicycle frames in the market, each with unique geometric design. It is possible that new designs will arise in the market as performance requirements evolve, especially in the culture of competitive cycling. Accessories currently in the market and in the prior art do not adequately address or support the needs of the new cycling environment, particularly in a cross over manner.

EU Patent Application No. 94200538.0 pertains to a bicycle stand having a single front and single rear arm. The front arm is intended to be seated under the front fork of a bicycle without its front wheels attached. The rear arm is intended to be seated under the bottom bracket shell of the frame between the peddle. The stand is elevated above ground, propped by two thin lengths of solid material that seated on the ground. The base of the frame comprising interconnected tubing framework, which relegates positioning of the front and rear arm to the furthest edge of the stand where the tubing frame provides a seat for the base of said arms. This design is unstable because the lightweight base and height by which a bicycle would be positioned above would likely result in tipping, particularly in windy conditions and over uneven ground surfaces. Further, the design requires removal of the front wheels in order to be applicable. This is an impractical requirement, particularly in time sensitive scenarios such as with marathon races where removal of a wheel would cause substantial delay. In addition, the front arm interferes with the user's range of motion by the front portion of the bicycle where adjustment may be required.

U.S. Pat. No. 564,787 provides a bicycle stand having a pair of front and rear vertical arms. Both sets of arms are attached to a lower set of lateral support tubes. The length of the arms and support tubes are nonadjustable in length, therefore limiting its application to a predetermined type and size of bicycle. The front arm is intended to be seated beneath the head tube of the bike frame and the rear arm is intended to be seated beneath the nuts and bolts attached to the rear wheel that protrude from rear derailleur hanger. This design becomes problematic if the rear wheel is removed from the bicycle and nothing is present to leverage the bicycle against the rear arm of the stand. As with the above cited art, the base comprises lightweight tube frame structure with little counter support at a lower center of gravity to avoid tipping. This design can be impractical as it relates to work occurring in near the rear portion of the bicycle.

U.S. Pat. No. 506,495 provides a bicycle stand similar to the above described patent No. '495. However, patent No. '495 comprise a single longer front arm with two shorter rear arms. The front arm similarly rests against the handle bar stem while the two rear tubes rests against the bicycle's rear hub. The problem here is similar to that found in U.S. patent No. '787 in that the support is removed if the rear tire is removed and a lightweight tube frame forms the base of the device.

U.S. Pat. No. 663,226 provides a single fore arm and two rear arms interconnected by a common lateral joint. This fore arm is positioned under the handle bar stem of a bicycle. The rear arms are positioned at a lower height beneath the rear hub of the bicycle wheels. This device is not designed to accommodate fluctuating, unpredictable and extreme uneven terrain.

The demand for a more agile and portable bicycle stand has arisen in the area of competitive cycling, a fast evolving culture and sport. The challenge within this industry continues to increase by adding more environmental variables, greater distances, faster speed, and tougher terrain. The variety of bicycle designs and the relevant needs not quite matching between the niche sports nor is their evolution as predictable. There remains a need for a bicycle stand that can evolve with the dynamic cycling culture.

SUMMARY OF INVENTION

The invention herein pertains to a device, specifically a modular weighted base bicycle stand having cross over and adjustable application. Said bicycle stand is comprised of light weight weather enduring durable material. The device of this invention having a removably attachable weighted planar base and several removably attachable extendable arms. Said weighted planar base comprising a continuous solid piece of durable planar material, having a length and a width wherein said length is longer than said width. Said length is no less than 24 inches and said width is no less than 10 inches. Said weighted planar base further having a top and bottom surface, a front and rear edge, a left and right edge relative to said front edge, said bottom surface resting on a ground surface and said top surface facing the ambient environment. Said weighted base comprising the heaviest portion of said device and providing counter support at a lower center of gravity which is important for a raised heavy bicycle susceptible to tipping.

A first and second extendable arm which are extendable by telescoping means removably attachable on or through the top surface of said weighted planar base towards the front edge either on or near said front edge. A third extendable arm, preferably by telescoping means, is removably attachable to the rear of said weighted planar base either on or near its rear edge. Said arms extending vertically above said base plate, each capable of pivoting angles within 180 degrees over the horizontal platform of said weighted planar base. The first and second arms having a total extended length greater than said third arm.

Said first, second and third arms comprising two or more nested telescoping hollow tubes, wherein said first and second arms having the same length at their fullest extended position, said third arm at its fullest extended position having a length shorter than said first and second arms at their fullest extended position, the minimum length of the first and second arm at their fullest extended position being 60 inches, the minimum length of the third arm at its fullest extended position being 30 inches.

Said first, second and third arms removably attachable at their bottom end by said rotating pivot. Said bottom end or rotating pivot being attached to or through the top surface of said weighted planar base. Said first and second arms positioned parallel along the cross section of the weighted planar base near or on its front edge. The third arm positioned along the cross section of said weighted planar base centrally between said first and second arms near or on the rear edge. The minimum distance between the first and second arms in attached position being 10 inches and the minimum distance between the third arm in attached position from either first or second arms in attached position being 18 inches.

The first, second and third arms in attached position to said weighted planar base having a maximum pivotal angle of 180 degree over a horizontal plane at its pivoting axis. The first, second and third arms may be temporarily fixed at a desired angle of pivot at its bottom end by a locking mechanism, the lengths of which when nested and recessed, lay flat and flushly opposite each other over the top surface of said weighted planar base without interference with an opposing said first, second or third arm.

The top distal end of each front arm is further connected to a pedestal bar and cradle. The pedestal bar comprising a short length of durable material extending perpendicularly outward from the distal end of said front arm. At the distal end of said pedestal bar is a raised cradle piece. The raised cradle piece comprising a short raised vertical bar perpendicularly raised above said pedestal bar. At the distal end of said raised vertical bar is a cradle piece wherein the handle bar of a bicycle rests securely over. The cradle piece is preferably a soft but durable material (such as or similar in texture and durability to rubber) for accepting any dimension bicycle frame part by nesting method. The pedestal bar may rotate around the distal end of the front arm within 360 degree horizontal and may be locked in position by a locking means or mechanism. The rear arm provides a similar rubber like cradle element at its distal end wherein the bottom bracket of a bicycle is seated over. The cradle element of the rear arm may be adjustable to accommodate nesting of larger and smaller bicycle frames.

The first, second and third arms are removably attachable or detachable and separately stored from said weighted planar base. The three arms and weighted planar base comprising modular components of the invention wherein a user may connect the arms to a found or recycled weighted base to create a personalized bicycle stand. Alternatively, the components may be detached and stored in smaller spaces. No such detachable modular bicycle stand currently exists in the prior art.

The extending, pivoting and rotational adjustment of the arms and their respective cradles provide cross-over capability for accommodating any bicycle size and shape. The weighted planar base provides sufficient surface area coverage to securely counterbalance bicycles of any weight or size category. The cradle suspension means provide positive support with minimum threat of damage to the bicycle frame structure.

The device in general is designed to avoid obstruction of access to the front and rear tires as it may or may not require removal, replacement or mounting. The front and rear arms of this device are positioned at the least obstructive locations of the bicycle away from access areas that generally involve adjustment. In this case, a user may access the crank, the various chains, the various pulleys, and the pedal without interference by the rear arm, which is nestled centrally behind these mechanical pieces. Additionally, by resting the left and right handle bars above the front arms, the center of balance is spread further outward providing greater stability and counterbalance affect by surface area coverage. The width, weight and surface area coverage and low center of gravity of the weighted planar base in contact with the ground surface reinforces the counterbalancing affect and helps to prevent tilting against side forces such as wind or handling. A plurality of adjustable feet attached to the bottom side (facing the ground) of the weighted planar base further enables fine tune adjustment of said device to level against uneven surfaces. Structural integrity and dual functionality may be manufactured into the weighted planar base by adding molded groove features that act as holding stations while reinforcing sturdiness of the base plate. A handle slit may be cut or molded into the side of the weighted planar base to allow for hand gripping or hanging suspension.

The device may be collapsed downward into a flat plank-like formation and may be hung from the side of a bicycle or placed inside a standard sized bicycle carrier. Graphics and artwork may be printed or molded onto the bottom surface of the weighted planar base for aesthetic style and marketing purposes. The ability to assign graphic art to this device provides important marketing and cultural value. Alternatively, a user may removably attach said first, second and third arms to a found base, such as a wake board, for personalized aesthetic and dual practical purposes. In this case, the found or recycled piece of weighted planar base may serve dual alternative application in another industry.

DETAILED DESCRIPTION

Reference will now be made in detail to exemplary aspects of the present invention which are illustrated in the accompanying drawings. Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 1:
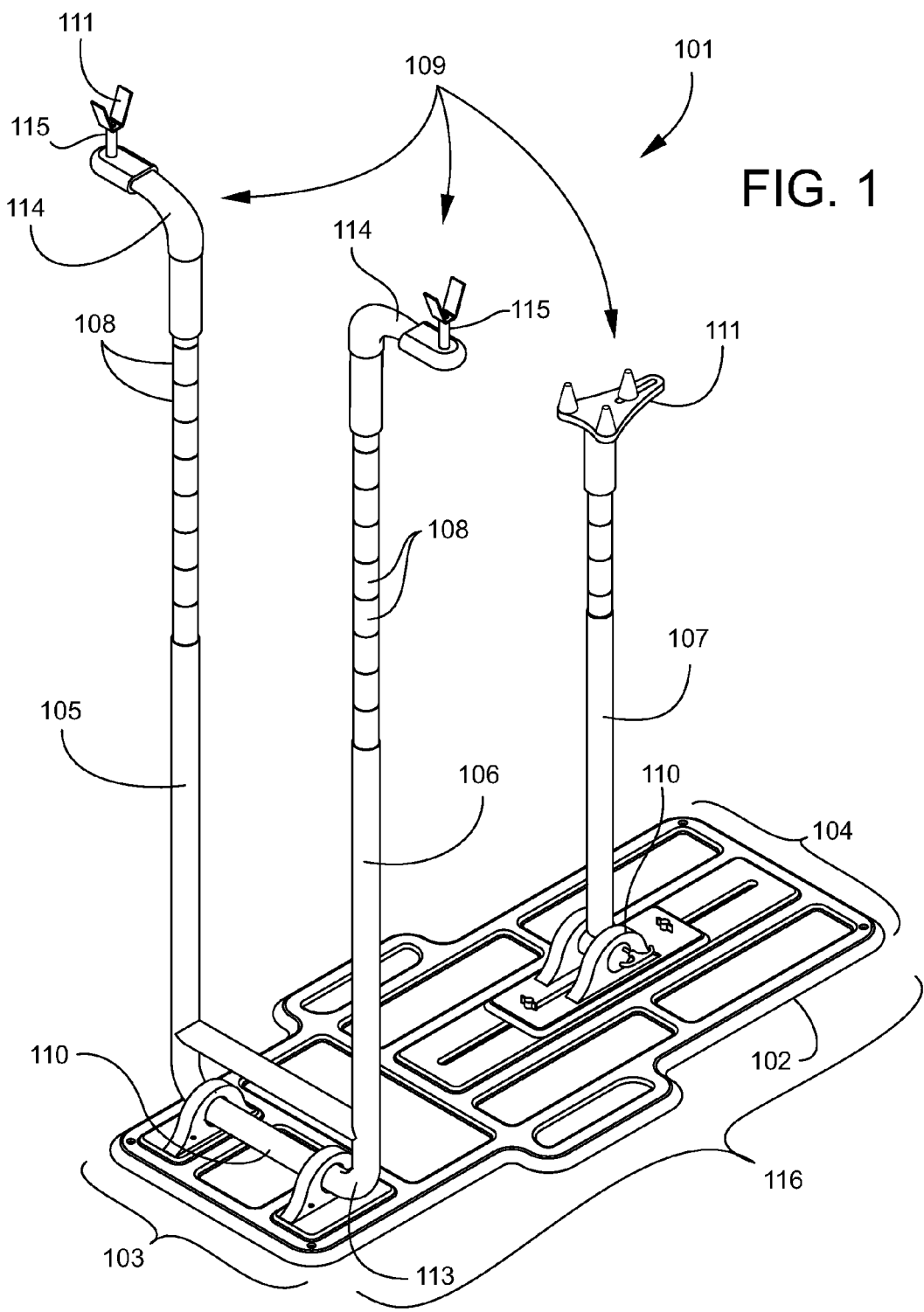
FIG. 1 is an exemplary perspective side view of said device according to the preferred embodiment described herein.
Figure 2A:
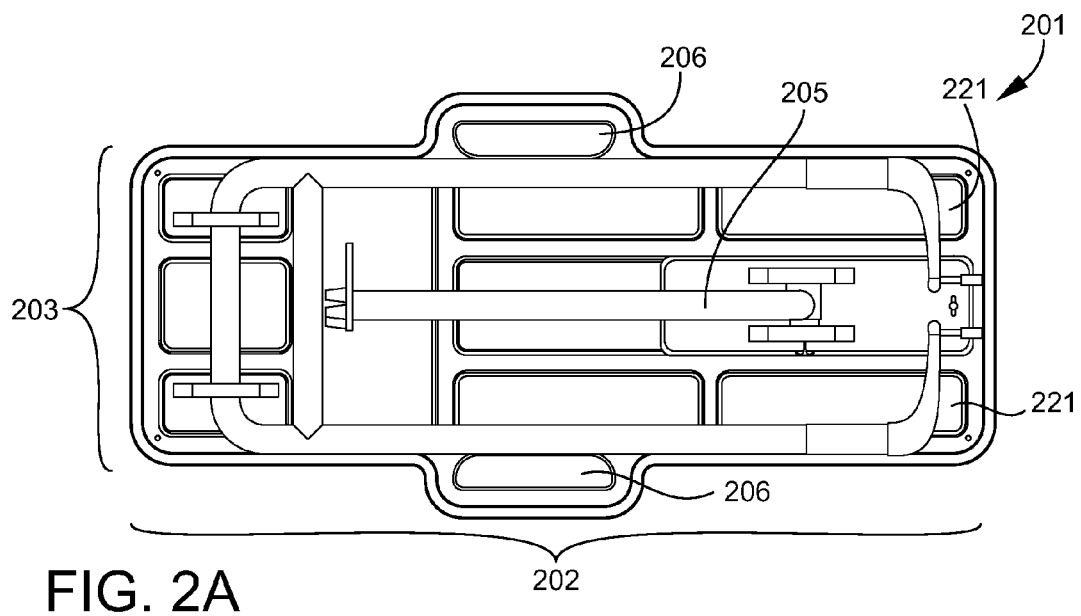
FIG. 2A is an exemplary top planar view of said device according to the preferred embodiment described herein.

A preferred embodiment of this invention according to FIG. 1 provides a modular weighted based bicycle stand 101 that may be adjusted to accommodate bicycles of different size and shape when in use. The preferred embodiment of the invention herein comprises a weighted planar base FIG. 1, 102 and FIG. 2A, 201 having a particular length 202, width 203 and thickness FIG. 2B, 210. The device is comprised of durable solid weather resistant material such as, but not limited to metal (such as steel or aluminum), carbon fiber, poly fiber, plastic, fiberglass, organic material (such as wood or bamboo), encapsulated organic material, encapsulated inorganic material (i.e. coated foam material), or combinations of such. According to the preferred embodiment herein, the device is manufactured with stamped aluminum components (7000 series aluminum with strengthens over time without need for heat treating). The weighted planar base FIG. 2B being approximate 3 millimeters thick 210 according to its preferred embodiment utilizing 7000 series stamped aluminum. The length of the weighted planar base is greater than its width. According to its preferred embodiment of FIGS. 2A and 2B, the folded size of the device is approximately 2 inches thick 211 by 13 inches wide 203 and 34 inches long 202, conforming to standard gear bag sizes. The load capacity of the preferred embodiment described herein utilizing stamped aluminum 7000 series is approximately 220 pounds, which can accommodate motorized bicycles. Each part or component of this device is mold ready for streamline manufacturing and a marketable result. Alternatively, the weighted planar base may comprise found or recycled material of similar size, weight and dimension for personalized aesthetic or environmental conservational reasons.

Figure 2B:
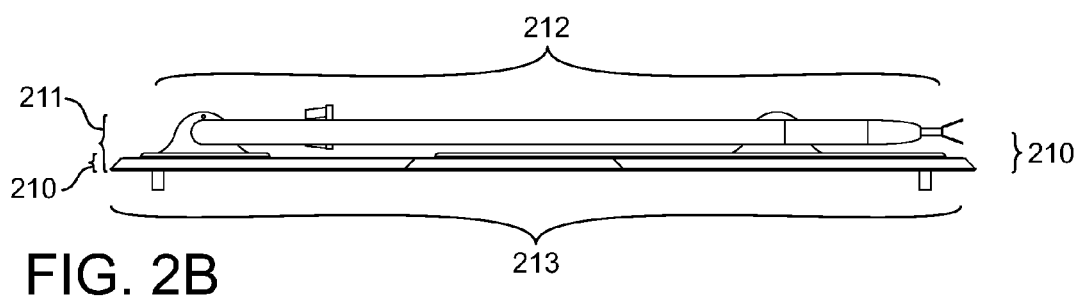
FIG. 2B is an exemplary side planar view of said device according to the preferred embodiment described herein.
Figure 2C:
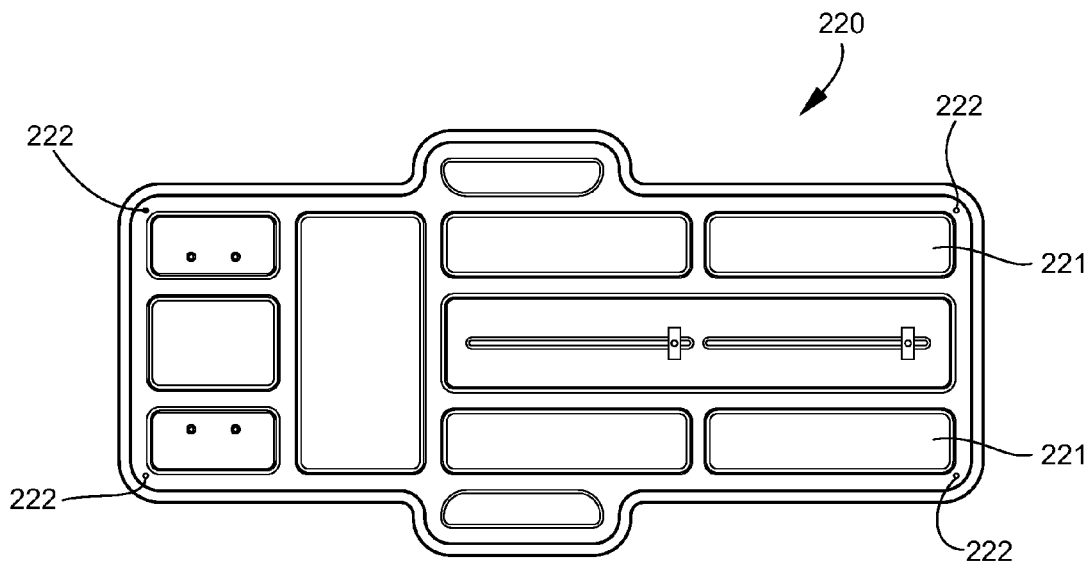
FIG. 2C is an exemplary bottom side planar view of said device according to the preferred embodiment described herein.
Figure 3:
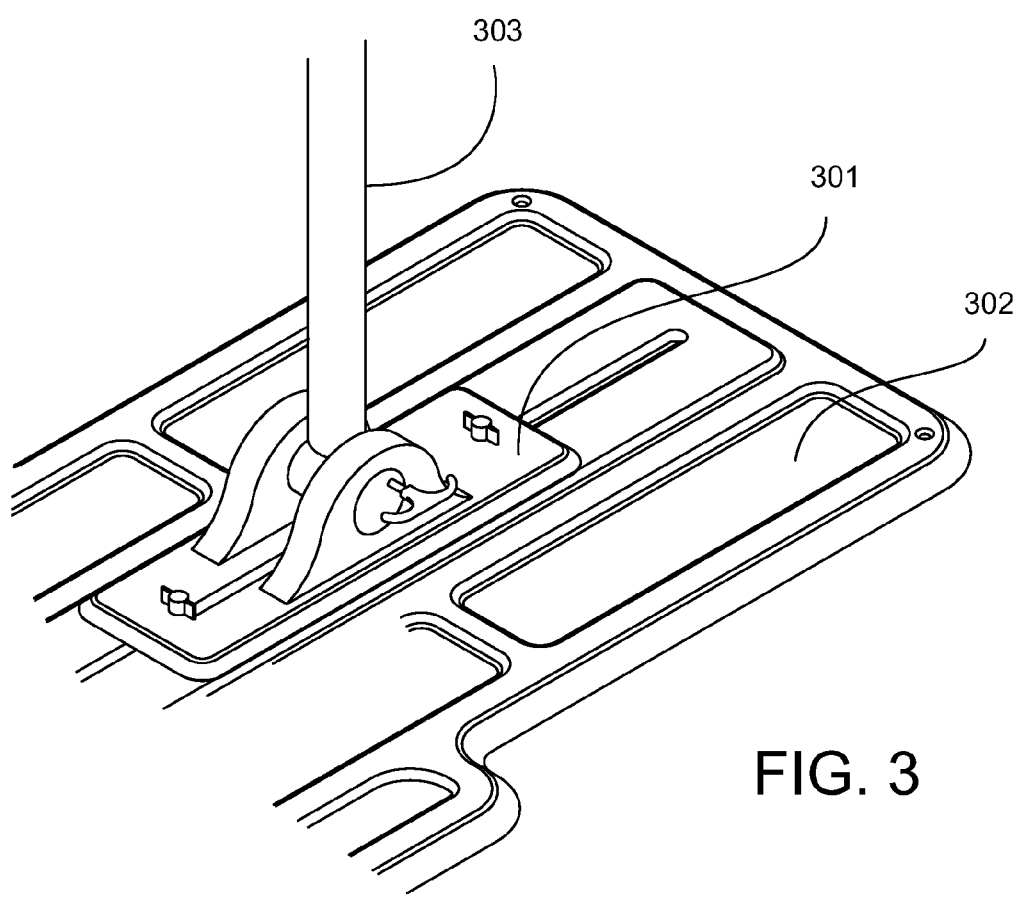
FIG. 3 is an exploded partial side perspective view of a portion of said device according to the preferred embodiment described herein.

The weighted planar base comprises a flat planar top surface (facing the suspended bicycle during use) FIG. 2A, 201, FIG. 2B, 212 and a flat planar bottom surface (facing the ground when in use) FIG. 2C, 220, FIG. 2B, 2B. The top 201 and bottom 220 surfaces may or may not be textured, grooved 221 or cut through as long as the weight and surface area parameters are met to achieve the desired counterbalancing effect. Grooved channels 221 or tray stations 221 are preferably stamped or molded into the weighted planar base for added structural integrity and dual functionality as holding areas for small components. A plurality of vertically adjustable feet attachments 222 are connected to the bottom surface of said weighted planar base to raise or lower any given side of said plate for leveling and stabilization purposes. Adjustment of the feet attachment 222 may be by screwing means, air pump means, or any known method in the art. This becomes particularly useful in circumstances involving uneven or slanted surfaces where fine adjustment of the stand position helps the user find the horizon and planar horizontal plane to aid with adjustment of the bicycle. The wide surface area coverage of the weighted planar base 102 and its greater weight provides low center of gravity counterbalance, compensating for the lightness of the overall device for enhanced stability.

Said weighted planar base 102 comprises a front end 103 and an opposing rear end 104 along its length 116. Two removably attachable extendable arms positioned at the front end 105, 106 of said weighted planar base 102. Each of the two front arms 105, 106 is positioned side by side and extends vertically upward. A third extendable rear arm 107 is positioned at the rear end 104 of said weighted planar base 102 and extends vertically upward. The arms comprising hollow nested tubes 108 that raise and lower between each other and interlock at desired locations by a twist and tightening means. The arms having a top end 109 and a bottom end 110. Located at the top end 109 is a cradle element 111 for suspending the frame of a bicycle. Located at the bottom 110 is a pivoting element FIG. 1 112, 113 and FIG. 3, 301 whereby, when attached to the weighted planar base 302, said arm 303 may pivot and rotate within 180 degree from horizontal.

The front arms 105, 106 are extendable, preferably by telescoping means 108. The arm extensions may be locked into position by a locking means or mechanism. According to the preferred embodiment, the locking means is by a twist and tightening affect between the nested tubes that comprise the telescoping arm. The maximum length of said front arms 105, 106 in extended position may be approximately 47 inches long. In retracted position, the length may be approximately 29 inches or shorter FIG. 2A, 204. The front arms may pivot at angles above the weighted planar base in planar fashion within 180 degrees from horizontal on the top surface of said weighted planar base. The arms may pivot whether in retracted or extended position. A locking mechanism is provided near the location of pivot to lock the arm at the desired angle. A marker may further be provided to mark the location or angle of choice for speedy repositioning between uses.

Similarly, the rear third arm 107 is extendable, preferably by telescoping means. The arm extension may be locked into position by locking means or mechanisms, preferably in this case a twisting and tightening affect between the nested tubes that comprise the telescoping arm. The maximum length of the rear arm in extended position may be approximately 29 inches long 107 according to this preferred embodiment. In retracted position, the length may be approximately 19.5 inches or shorter FIG. 2A, 205. The rear arm may also pivot at angles above the weighted planar base in planar fashion within 180 degrees vertical from said base plate. The arm may pivot whether in retracted or extended position. A locking mechanism is provided near the location of pivot to lock the arm at the desired angle. A marker may further be provided to mark the location or angle of choice for speedy repositioning between uses.

The suggested maximum retracted lengths of the first, second and third arms as described herein is to ensure that when pivoted downward in folded position, none of the arms would interfere in each other's space such that all arms fold down flushly against the top surface of said weighted planar base. See FIG. 2A. This would be an ideal position for purposes of storage or transport of said device.

Figure 4:
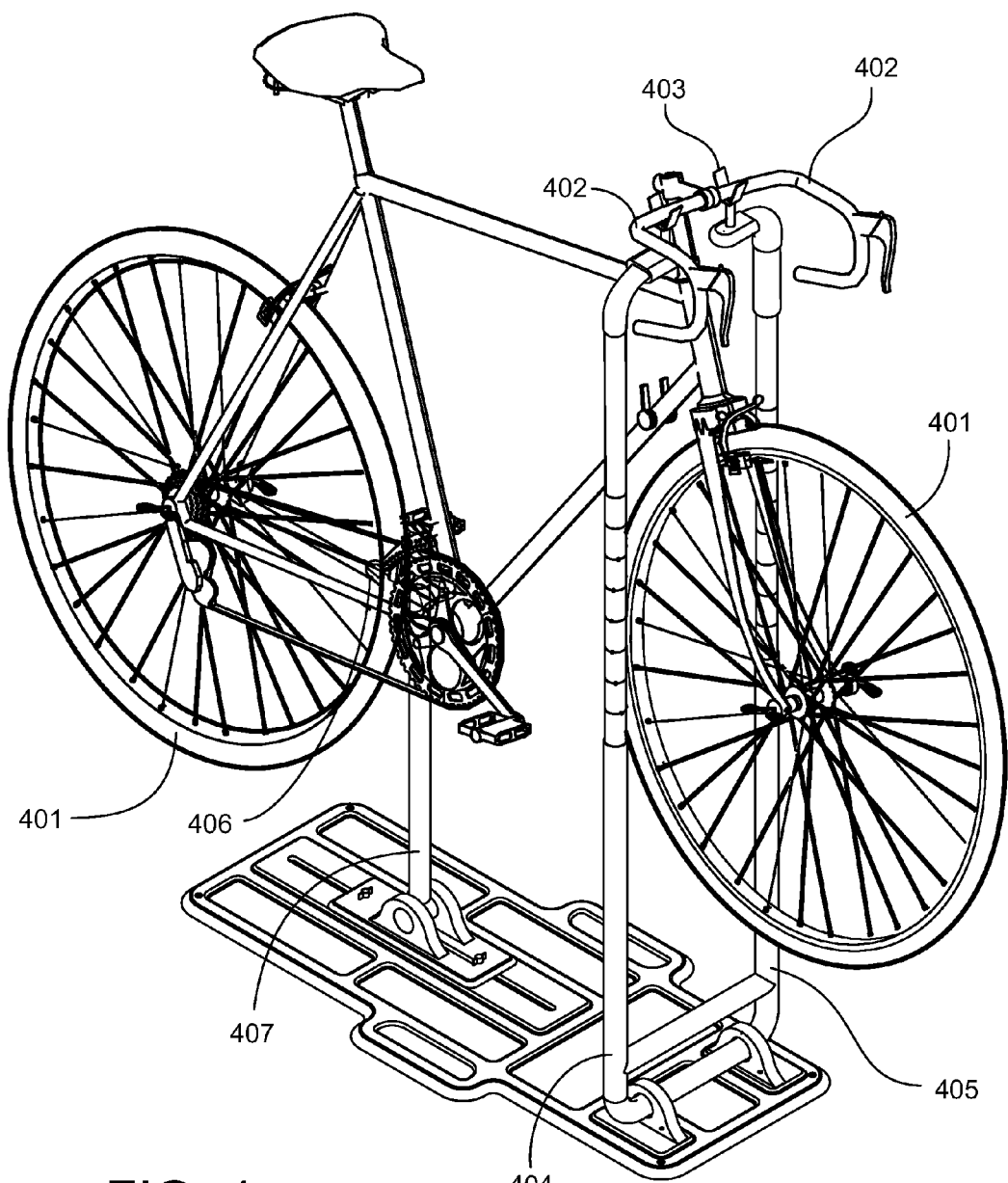
FIG. 4 is a side perspective view of said device according to the preferred embodiment described herein.
Figure 5:
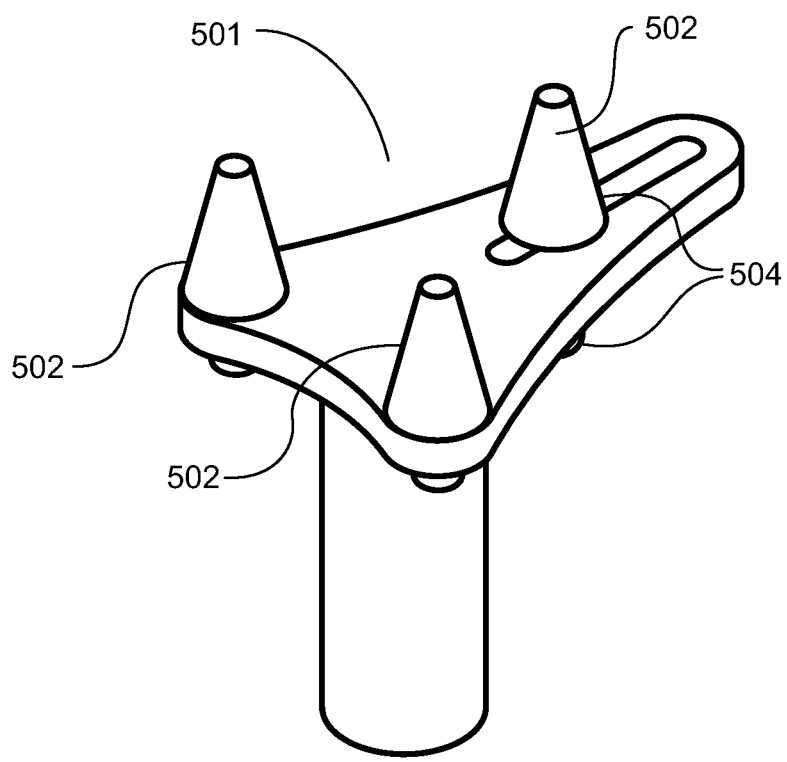
FIG. 5 is an exploded partial side perspective view of a portion of said device according to the preferred embodiment described herein.

Extending outward from the exposed distal end of the two front arms is each a short pedestal bar approximately 6 to 8 inches 114 long according to the preferred embodiment. Said pedestal bar 114 comprising similar lightweight durable weather resistant material. At the distal end of said pedestal bar is a raised cradle piece 111. The raised cradle piece 111 comprising a short raised vertical bar 115 perpendicularly raised above said pedestal bar. At the distal end of said raised vertical bar is a cradle piece 111 wherein each handle bar of a bicycle 401 may rest upon securely FIG. 4. The pedestal bar 114 may rotate within 360 degree in planar horizontal position around the front arms 105, 106. The pedestal bar 114 is locked into position by a locking mechanism with a marker option for quick recall of a preferred position. The angle adjustment of this device maximizes the ability of said stand to accommodate bicycle designs of any shape and size. Additionally, the cradle allows the bicycle to rest by gravitation suspension without need for clamping means of security. According to the preferred embodiment herein, the cradle of the front arms comprises curved or nestable receiving area to allow the diameter of a bicycle handle bar to rest overtop in nested fashion. The rear arm provides a similar cradle element FIG. 5, 501 to allow the bicycle to rest at its bottom bracket between the left and right pedals. The cradle element 501 of the rear arm positioned at the top end of the rear arm 107 comprising a plurality of adjustable rubber pieces 502 that are oppositely position such that the space between the rubber pieces may be widened or narrowed by a slidable plate 504 below. The purpose of adjustability in this case is to accommodate variety in diameter brackets. The cradle element of all three arms in this case may also rotate at 360 degree around the distal end of said arms for additional accommodative purposes. Alternatively, the cradle element on either front or rear arms may comprise a single continuous rubber piece with a slot or curved groove to enable nesting of tube brackets or handles of any diameter.

During use, the handle bar 402 of a bicycle 401 rests and is suspended over the cradles 403 of the two front arms 404, 405. At the same time, the bottom bracket 406 (hidden behind the bicycle gear in FIG. 4) of the bicycle frame rests over the rear arm cradle (hidden behind the bicycle gear in FIG. 4) in nested manner. For purposes of storage or transport, the device may fully collapse wherein the front 404, 405 and rear arms 407 retract to their shortest length and fold inward and downward towards the weighted planar base. See FIG. 2A. The device in collapsed position is flat and small enough to fit within a standard sized bicycle travel case. A handle groove or slit 206 opening may be provided along one or multiple side edges of the weighted planar base for hand gripping or hanging suspension. In this case, the collapsed device may be hung to the side of the bicycle while the bicycle is being ridden without obstruction to the user's movement. Other methods for carrying said device manually or mechanically may shoulder straps, back straps, or wheel attachments. In its collapsed position, the bottom surface of the weighted planar base provides a wide exposed outward facing surface area. This space may accommodate art or graphic work for aesthetic or advertising purposes. Alternatively, the weighted planar base may contain multiple grooves in decorative pattern without comprising the intended surface area coverage and counterbalancing effect. The device may further be decorated by utilizing a weighted planar base of found or recycled material.

Said first, second and third arms being removably attachable to said weighted planar base may be removed and stored separately from said weighted planar base. This is particularly advantageous in cases where said weighted planar base is found material having dual concurrent usability, such as a wake board for water activities. When the extendable arms are removed, said board may be used for the alternative purpose, i.e. wake boarding activities. When the arms are attached, the found material would serve the alternative purpose as a bicycle stand.

Having fully described at least one embodiment of the present invention, other equivalent or alternative devices will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

I claim the following invention comprising:

1. A set of three arms support wherein each arm support is removably attachable to a receiving portion of a planar base forming a modular planar base bicycle stand, said set of three arm support of the invention herein comprising a first, second and third arm, each arm having adjustable length, a top end and a bottom end, said top end of each arm attached to a receiving cradle, said receiving cradle being rotatable, and said bottom end of each arm attached to a pivot mechanism, said pivot mechanism of each arm attachable to a receiving portion of a planar base, said first and second arms support comprising the same length at their fullest extended position and comprising the same length at fullest compressed position, said third arm support comprising a length shorter than said first and second arm at their respective fullest extended and fullest compressed position, the length of said first and second arm support in their fullest extended position comprising at least 60 inches, the length of said third arm in its fullest extended position comprising at least 30 inches, each said first, second and third arm support comprising a means for adjusting their each said length to a preferred extended or compressed fixed position, each said first, second and third arm support further comprising a locking mechanism to temporarily lock into a preferred extended or compressed fixed position, said first, second and third arm support being movable from their each said pivot mechanism within a 180 degree angle of pivot above a horizontal plane, each said pivot mechanism further comprising a locking mechanism to temporarily lock said first, second and third arm support at a preferred fixed angle of position within said 180 angle of pivot over a horizontal plane, said first, second and third arm support are removably attachable to a receiving portion of a planar base at their each said pivot mechanism, said first, second and third arm support are separately removable, portable and storable.

2. A planar base for receiving three arm support forming a modular planar base bicycle stand said planar base comprising solid durable material forming a horizontal platform having a planar top surface, a planar bottom surface, a front end and a rear end, said planar base having a minimum length and minimum width, said minimum length being no less than 24 inches and said width being no less than 10 inches, said planar base further comprising a first, second and third receiving portion on its top surface, each said receiving portion of a planar base connectable to a vertical length of arm support, said first and second receiving portion disposed at the front end of said planar base in parallel position of each other, said third receiving portion disposed centrally rearward of said first and second receiving portion, said first and second receiving portion being spaced apart from each other in parallel position by no less than 10 inches and said distance between the position of said first or second receiving portion from said third receiving portion is no less than 18 inches, said planar base further comprising at least four height adjustable foot elements extending downward from the bottom surface of said planar base, each adjustable foot element positioned opposite of each, each said adjustable foot element being independently adjustable in height by fine increment.

3. Wherein said planar base of claim 2 is comprised of organic, inorganic or composite material including aluminum, steel, carbon fiber, fiberglass, bamboo, wood, plastic, foam, and combinations thereof.

4. Each said first, second and third arm support of claim 1 further comprising an adjustable length by telescoping means such as nesting and twisting means.

5. Each said receiving cradle of said first, second and third arm support of claim 1 is rotatable within 360 degrees around a horizontal plane to a preferred fixed angle of position.

6. Each said receiving cradle of said first, second and third arm support of claim 1 further comprising a locking mechanism to temporarily lock into a preferred fixed angle of position.

7. Each said receiving portion of claim 2 including a pivoting means.

8. Said pivoting means of claim 7 having a range of pivot within 180 degrees above said top surface of said planar base.

9. A modular planar base bicycle stand comprising a planar base and a first, second and third support arm, said planar base comprising solid durable material forming a horizontal platform having a planar top surface, a planar bottom surface, a front end and a rear end, said planar base having a minimum length and minimum width, said minimum length being no less than 24 inches and said width being no less than 10 inches, said planar base further comprising a first, second and third receiving portion on its top surface, each said receiving portion including a pivoting means, said pivoting means having a range of pivot within 180 degrees above said planar top surface and temporarily lockable to a preferred angle of position by a pivot locking means, said first and second receiving portion disposed at the front end of said planar base in parallel position of each other, said third receiving portion disposed centrally rearward of said first and second receiving portion, said first and second receiving portion being spaced apart from each other in parallel position by no less than 10 inches and said distance between the position of said first or second receiving portion from said third receiving portion is no less than 18 inches, at least four height adjustable foot elements, each positioned at opposite ends of said planar bottom surface and extending downward from said planar bottom surface, each said height adjustable foot element being height adjustable by fine increment, said first, second and third arm support each having an adjustable length, a top end and a bottom end, said top end of each arm attached to a receiving cradle, said receiving cradle being rotatable around a horizontal plane by 360 degrees, and said bottom end of each arm support attachable to said receiving portion of said planar base, the length of said first and second arm support in their fullest extended position comprising at least 60 inches, the length of said third arm support in its fullest extended position comprising at least 30 inches, each said first, second and third arm support being adjustable in length by an adjusting means and temporarily lockable to a preferred position by an arm adjustment locking means.

* * * * *